May 21, 1963 J. SCUDDER 3,090,459
HAND DRAWN VEHICLE WITH POWER ASSIST
Filed July 21, 1959 4 Sheets-Sheet 1
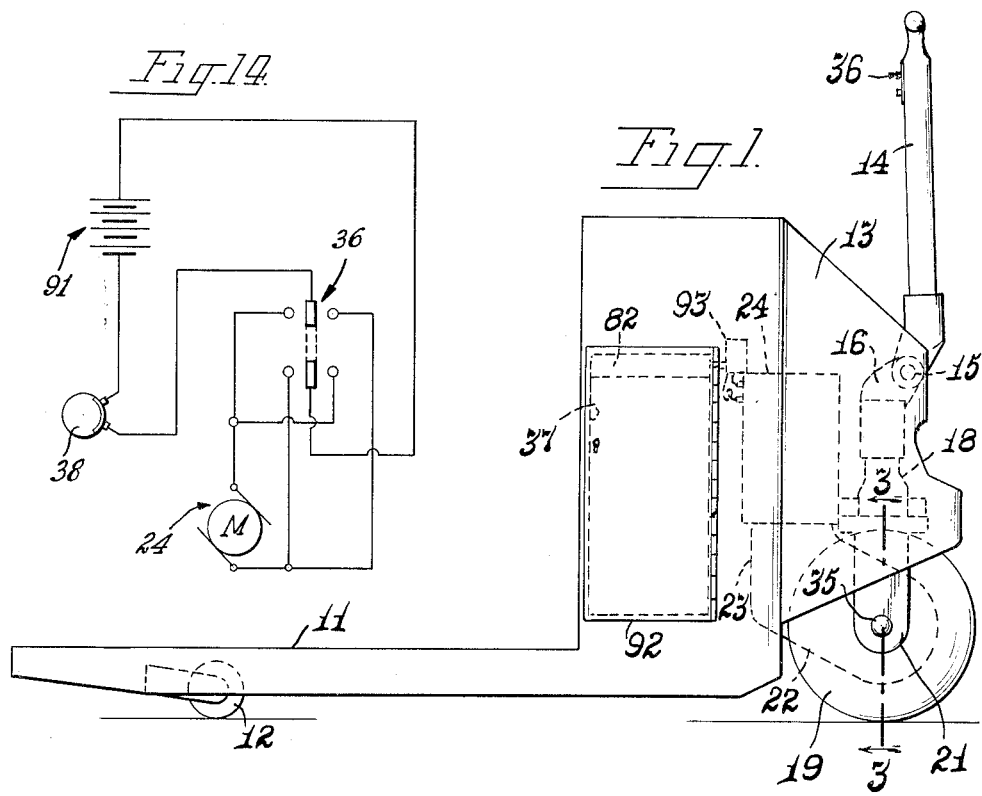
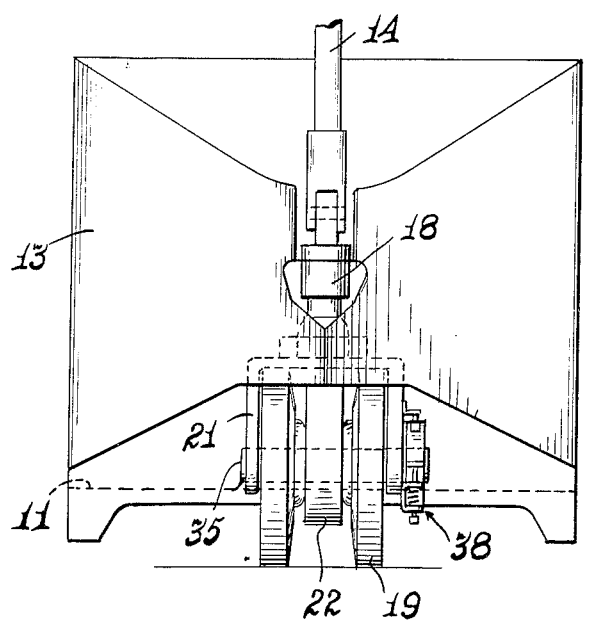
INVENTOR.
John Scudder May 21, 1963 — J. SCUDDER — 3,090,459
HAND DRAWN VEHICLE WITH POWER ASSIST
Filed July 21, 1959 — 4 Sheets-Sheet 2

INVENTOR.
John Scudder
BY Elmer L. Quicksel
Atty.

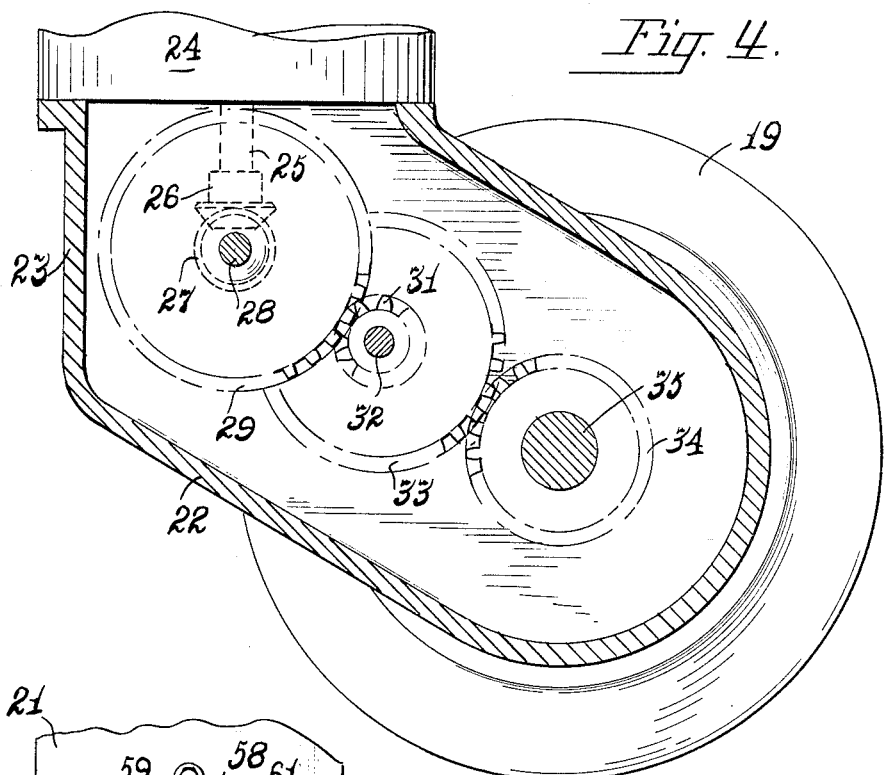
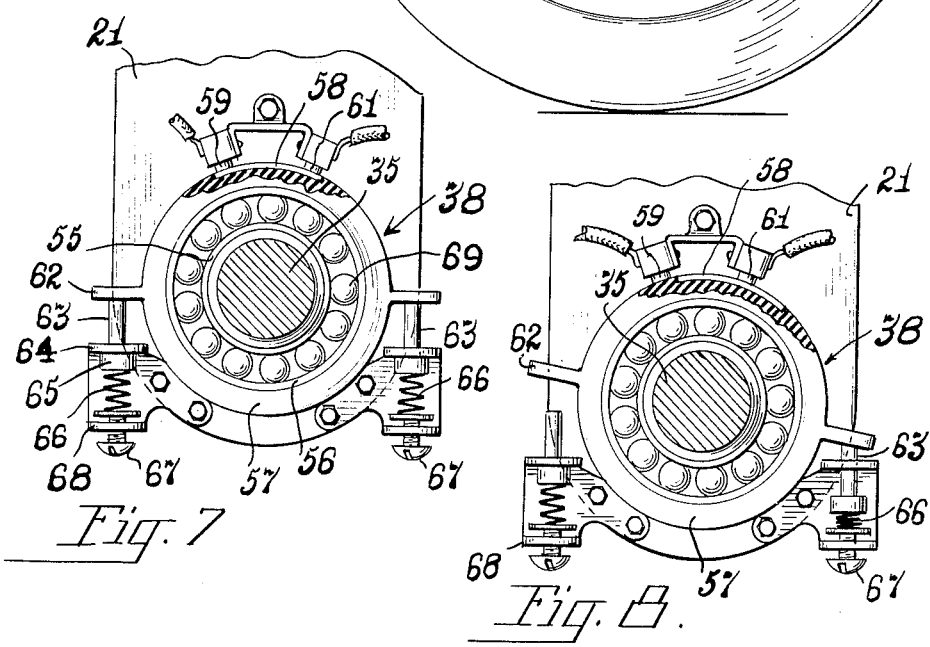

May 21, 1963 J. SCUDDER 3,090,459
HAND DRAWN VEHICLE WITH POWER ASSIST
Filed July 21, 1959 4 Sheets-Sheet 4
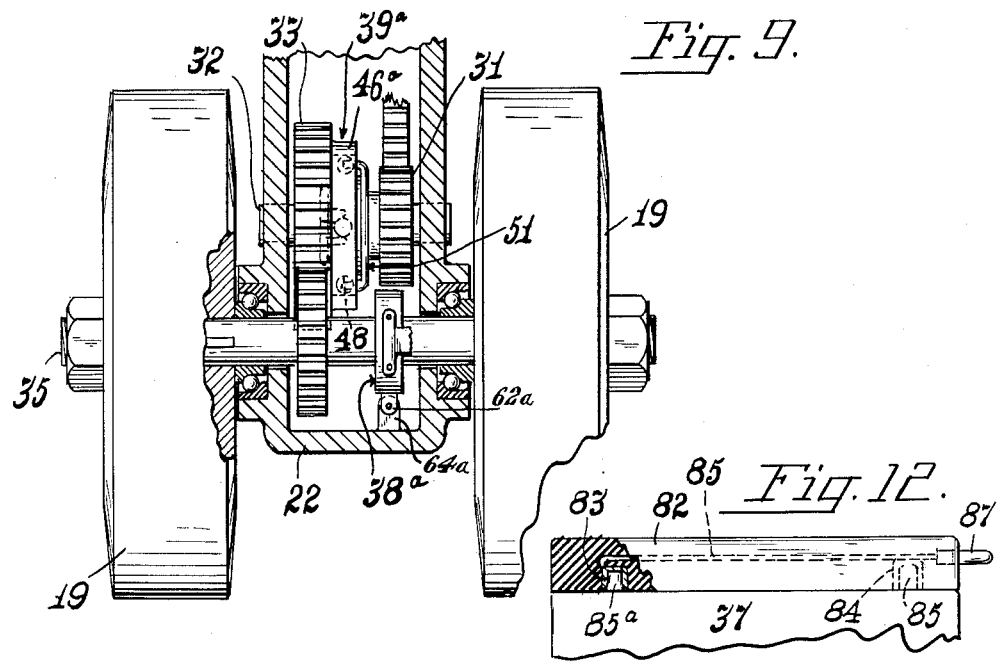
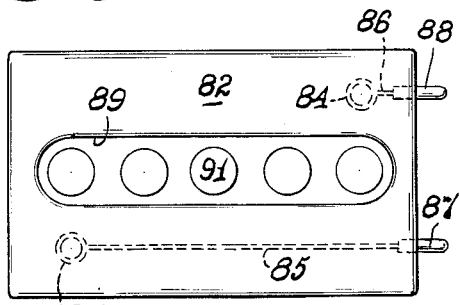
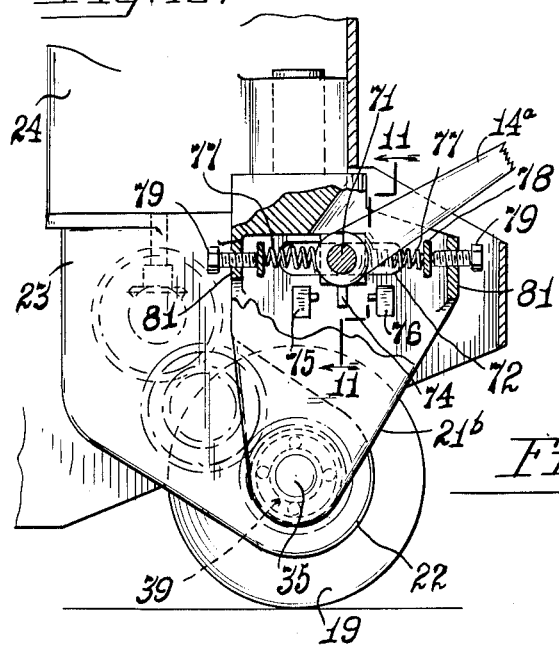
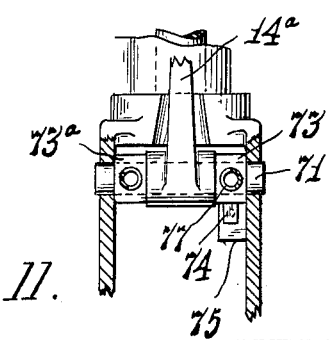
INVENTOR.
John Scudder
By: Elmer L. Qwickel
Atty.

//nited States Patent Office
3,090,459
Patented May 21, 1963

3,090,459
HAND DRAWN VEHICLE WITH POWER ASSIST
John Scudder, 723 W. 81st St., Chicago, Ill.
Filed July 21, 1959, Ser. No. 828,634
10 Claims. (Cl. 180—19)

The invention relates to improvements in material handling trucks and is more particularly concerned with the novel construction of a manually or hand drawn truck having novel means embodied therein which is automatic in its operation for starting and stopping power means to assist starting a heavy load and climbing an incline, such as a dock plate, door or the like.

Various types of power operated material handling trucks have been provided with automatic or manually controlled means to connect an auxiliary power source with the drive mechanism to assist starting and movement up an incline. However, such truck mechanisms are very involved mechanically and costly to manufacture and maintain serviceable. Further, there are many instances of truck requirements that are not suited for the use of full power trucks. One such instance is where loads to be transported are normally such that they can be moved more economically by a hand drawn truck. It frequently occurs that the operator of such truck experiences difficulty in starting the load and in moving the load up a ramp or inclined dock plate. In one embodiment of the present invention inexpensive means under control of the operator, is provided to assist movement of the load, and in another embodiment disclosed herein the power assist means is not within the control of the operator but is rendered operable only when excessive effort is applied to move the load.

The present structure affords means to apply power to at least one supporting wheel until such time as load is moving at a predetermined rate of speed, whereupon the power is cut off automatically and the load is thereafter drawn manually. Also, when an incline or other obstruction requiring additional manual effort is encountered, the operator in many instances must call for assistance. Under such circumstances the normal reduction in the speed attained while drawing the truck along a level surface, causes the power drive control means to be actuated to start the power assist means. As soon as normal speed is reached the power assist means is again cut out and the truck is drawn manually.

The present invention contemplates the incorporation of a bi-directional free-wheeling or override clutch in the wheel intended to receive power for connecting and disconnecting the wheel and its axle, and a novel bi-directional switch mechanism responsive to the torque on the wheel axle for opening and closing the electrical circuit to an electric motor. Electrical power for the motor is supplied by conventional storage battery having novel electrical connection with the circuitry, adapting a spent battery to be easily and quickly removed and replaced.

It is therefore an object of the invention to provide novel means to assist movement of a manually drawn material handling truck under peak loads.

Another object of the invention is to provide a truck of the character referred to with a novel constructed bi-directional centrifugal automatic clutch.

Another object is to provide a truck of the character described with a novel torque or load controlled bi-directional switch mechanism in the circuitry thereof.

Another object is to provide novel means and mechanism for connecting a storage battery in the circuitry of a truck of the character referred to.

Another object is to provide a novel drag bearing mount for a bi-directional switch mechanism.

Another object is to provide a manually operated material handling truck with novel means to assist in the operation thereof which is not expensive to manufacture, is safe to operate and economical in maintenance and operation and very efficient in use.

The structure by means of which the above noted and other advantages of the invention are attained will be described in the following specification, taken in conjunction with the accompanying drawings, showing two preferred illustrative embodiments of the invention, in which;

FIG. 1 is a side elevational view of a representative manually drawn type of material handling truck embodying features of the invention.

FIG. 2 is a front elevational view thereof.

FIG. 4 is a vertical sectional view taken substantially on line 4—4 of FIG. 3.

FIG. 7 is an elevational view of the torque switch, taken on line 7—7 of FIG. 3, showing the switch in circuit closing condition, and parts in section.

FIG. 8 is a view similar to FIG. 7, showing the switch in circuit open condition.

FIG. 9 is a view similar to FIG. 3, but illustrating a modified form of assembly.

FIG. 10 is a fragmentary side elevational view of the front end of a hand truck, showing parts in section and illustrating another form of electric circuit control.

FIG. 11 is a detail view taken on line 11—11 of FIG. 10.

FIG. 12 is a fragmentary side elevational view of a storage battery showing a novel removable conduit carrying cover plate mounted thereon.

FIG. 13 is a top plan view of the cover plate.

FIG. 14 is a diagrammatic showing of the electric circuit.

Figure 3:
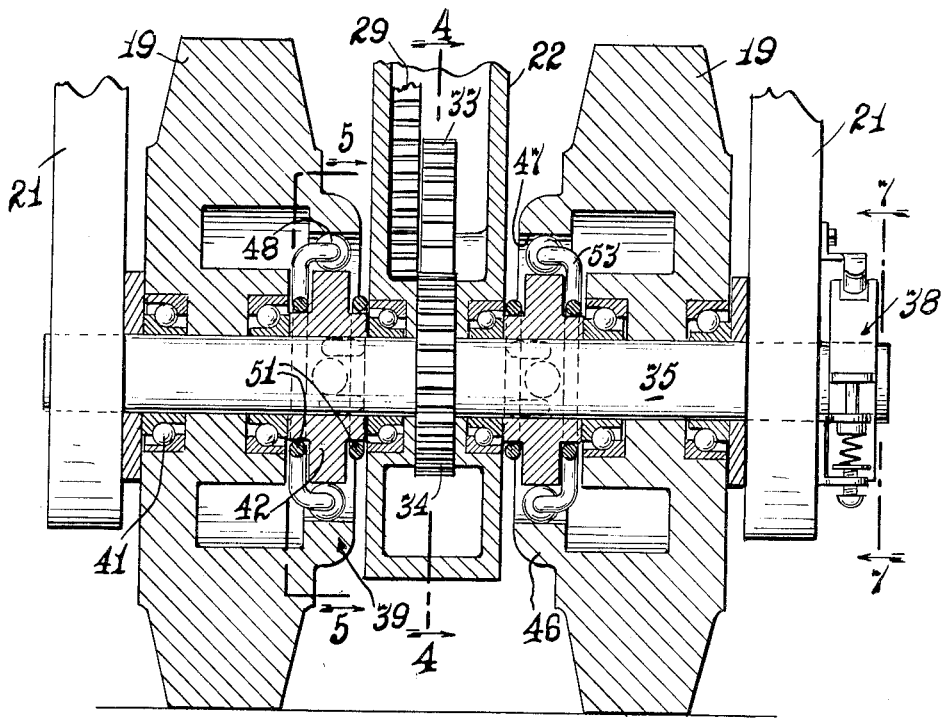
FIG. 3 is an enlarged vertical sectional view of the power wheel assembly, taken substantially on line 3—3 of FIG. 1.

Referring to the representative illustration of a manually drawn material handling truck best illustrated in FIGS. 1 and 2 in the accompanying drawings and embodying features of the present invention, the truck may comprise a pallet supporting platform 11 suitably supported at its rear end by wheels 12 which may be of a character to be selectively raised and lowered for purposes of raising and lowering platform 11 beneath a pallet (not shown). The forward end of the truck has an upstanding housing 13 of conventional construction within which is mounted the usual mechanism for raising and lowering wheels 12 upon manipulation of a handle 14. Inasmuch as such mechanism does not enter into combination with the features of the present invention it is not disclosed. The handle 14 is shown in a raised position of non-use, it being pivotally mounted, as at 15, to a bracket 16 secured to the upper end of a vertical steering wheel journal 18 mounting steerable wheels 19.

More particularly, wheels 19 are mounted for free rotation on axle 35 journalled in spaced bearing supports 21 depending from journal 18, one on each side of a housing 22 which extends rearwardly, upwardly and terminates in a substantially vertical portion 23 upon which is mounted firmly a reversible electric motor 24. Motor 24 is connected at all times and by means of any suitable reduction gear train to wheel axle 35.

A representative gear train is perhaps best shown in FIGS. 3 and 4. As illustrated, motor 24 has its shaft 25 extend downwardly on a vertical axis into housing 22—23 and carries a bevel gear 26 on its lower extremity. Gear 26 meshes with bevel gear 27 on stud shaft 28 journalled in said housing and which carries a gear 29 secured firmly thereto. A pinion 31, carried on an idle shaft 32, meshes at all times with gear 29 and said shaft carries firmly thereon a larger gear 33 that is meshed with gear 34 on wheel axle 35.

The motor 24 is connected in an electrical circuit illustrated in FIG. 14, which includes a manually actuated forward-reverse switch element 36 (FIG. 1) mounted in handle 14, a storage battery 37, and a normally closed bi-directional torque switch, generally indicated at 38 (FIG. 2) and to be described in detail presently.

Briefly recited, when the hand truck is at rest and loaded, the operator grasps the handle 14 and at the same time closes one of the switches in forward and reverse switch 36. This permits current to flow through the normally closed torque switch 38 to motor 24, operating the same, in either a forward or a reverse direction, and rotate wheel axle 35. Initial axle rotation, engages automatic clutches 39, associated one with each wheel 19 and to be described in detail presently, so as to drivingly connect the wheels to the axle for driving said wheels and moving the truck in the intended direction under power. As soon as the initial inertia of the load is overcome during such initial power operation of the truck, torque switch 38 operates to cut off the flow of current to the motor and the truck is then drawn manually. Manual drawing of the truck, while the motor and the axle are idle, restores centrifugal clutches 39 to their initial disengaged condition and restores the wheels to their free wheeling condition so that movement of the truck is not impeded by the drag of the motor and its driving gear train.

Should an incline or other obstacle difficult to ascend be encountered while the truck is being drawn manually the resulting slowing of the truck to below the pre-set torque switch speed, the torque switch 38 closes, thus restarting the motor to drive the axle 35 at a speed greater than wheel rotation and again engage the automatic clutch mechanism to apply power directly to wheels 19. When the obstacle is overcome and normal conditions of operation are again reached the switch 38 opens and the clutch mechanism is disengaged restoring the truck to manual control.

Figures 5, 6:
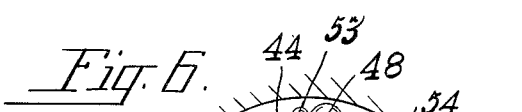
FIG. 5 is an elevational view of the override clutch mechanism, taken on line 5—5 of FIG. 3, showing the clutch engaged.
FIG. 6 is a view similar to FIG. 5, showing the clutch disengaged.

Referring now to the automatic clutch mechanism 39, best shown in the embodiment illustrated in FIGS. 3, 5, and 6, the axle 35 is extended through housing 22 and has driven wheels 19 mounted for free rotation thereon, one on each side of said housing inwardly of bearing supports 21. The wheels and the clutch mechanism associated with each are alike and the following description of one assembly will serve to describe both and like numerals are used to identify corresponding parts.

As best shown in FIG. 3 wheel 19 has anti-friction bearings 41 mounting it for free wheeling on axle 35. Mounted between housing 22 and wheel 19 is a cam plate 42 that is keyed or otherwise secured to axle 35. This cam plate includes a hub 43 and said plate is generally circular in outline and is formed with diametrically opposed pairs of cam surfaces 44, 45 (FIGS. 5–6) on its periphery. The cam plate is seated to lie within the plane of an annular flange 46 on the wheel having an inner circular surface 47 opposed to and spaced outwardly from the periphery of the cam plate. Anti-friction bearing elements 48, either ball or roller, are arranged in the space 49 one between each cam surface 44—45 and flange surface 47.

In the present disclosure, the diametrically opposed pair of cam surfaces 44 are inclined in one direction circumferentially whereas cam surfaces 45 are inclined circumferentially in the opposite direction. As is well understood in this art, when the axle is rotated in one direction, for example in the clockwise direction indicated by the arrows in FIG. 5, the bearings 48 seated on cam surfaces 44 are thrown outwardly radially and are wedged between said surfaces and annular flange surface 47, thus locking the wheel to the axle for driving the wheel in a clockwise direction so as to move the truck in a forward direction. Similarly, when the axle is driven in a reverse direction for moving the truck backwardly, bearings 48 between cam surfaces 45 and said flange surface 47 are thrust into wedging position therebetween to again lock the wheel to the axle. In each instance when motor 24 is idle and rotation of the axle ceases, the bearings previously wedged in drive condition roll into non-wedging condition as shown in FIG. 6 by continued free wheeling rotation of the wheel during manual operation.

Novel means is provided to prevent any one or more of the bearings 48 from dropping by gravity into wedging condition. As shown, the bearings 48 operating on cam surfaces 44 are embraced by a spider 51 comprising a collar 52, mounted for free rotation on hub 43, and having diametrically opposed pairs of radial arms 53 each embracing a bearing 48. A spring 54 connected at one end to one of said arms and at its other end to cam plate 42 normally urges said spider in a direction to hold the engaged bearings in non-wedging condition as best shown in FIG. 6. A similar spider and spring assembly is operably associated with the other pair of bearings 48 and is identified by corresponding numerals. It should be evident that the automatic clutch mechanism is operable to disengage the wheel from the axle and its connected gear train when the speed of rotation of the wheel exceeds that of the axle and that when the axle is driven in either direction at a speed in excess of the wheel speed the wheel is connected thereto so as to be driven thereby.

The bi-directional torque switch mechanism 38 previously referred to and best shown in FIGS. 3, 7 and 8 is operable automatically to start and stop motor 24 in either forward or reverse direction as determined by the manual closing of either switch in switch element 36. This switch mechanism 38 is normally closed and is mounted on axle 35 so as to be rendered operational by the torque thrust of said axle. More specifically, to start a heavy load, the operator will close and hold closed one of the switches in directional switch element 36 and, because the axle 35 is idle and the torque switch closed, current is supplied to the motor for driving the axle. Axle rotation engages the centrifugal clutch mechanism and drives the wheels to start the load under power. When the load is started and reaches a pre-set speed controlling operation of torque switch 38, said switch opens and cuts off the flow of current to the motor whereupon the clutch mechanism 39 is disengaged and the truck can be drawn manually. The switch element 36 may then be released to return to its open condition. Because axle rotation has ceased, switch 38 returns to closed condition but because switch element 36 is open, the motor remains idle.

When the truck moves up an incline or encounters sufficient resistance to slow its movement under manually applied power, the operator again closes the selected directional switch element 36 to again close the motor circuit and deliver power to the wheels. In actual operation while switch element 36 is held closed and during rotation of axle 35, the torque switch 38 will fluctuate between open and closed condition at a rate depending on the relative speeds of axle and wheel rotation as long as switch 36 is held closed. This is because of the provision in the switch mechanism, of novel torque control or speed responsive means now to be described.

Referring now to the torque switch mechanism 38 best shown in FIGS. 7 and 8, said mechanism includes a bearing, either single or double sealed ball or roller, having its inner race 55 press-fitted on axle 35 and its outer race 56 press-fitted or otherwise secured firmly in a collar 57 of electric insulation material. Collar 57 has embedded in its periphery a segment of electric conductive material such as the copper bus-bar 58 illustrated. A pair of brushes 59—61, connected in the electric circuit with switch element 36 and motor 24, normally are seated in electrical contact with bar 58 so as to close the circuit between them.

Collar 57 has diametrical radially projecting lugs 62 each abutting the upper end of a pin 63 that projects upwardly freely through a fixed stop plate 64 and has a head 65 normally seated against the bottom face of said stop plate. Springs 66, one for each pin, retain the pins in the described position and said springs may have their tension adjusted by means of adjusting screws 67 arranged therebeneath and carried in fixed brackets 68. Springs 66 are pre-adjusted to maintain the collar 57 normally in the circuit closing postion shown in FIG. 7. Preferably, the raceways 55—56 are of such relative size with respect to the elements 69 therebetween so as to resist free relative rotation. Otherwise stated, the bearing 55—56 is constructed to offer slight resistance or drag to relative movement so as to make the switch assembly 38 non-sensitive.

More specifically, it is well understood that all friction between the raceways and balls of an anti-friction bearing cannot be eliminated. This normal or inherent friction is, in the present instance, increased to a small degree by the relative tight fit between the bearing parts. Thus, when axle 35 is rotated at operating speeds, the small amount of friction induced by the normal and induced drag (in the order of several ounce-inches of torque) present between elements 69 and the raceways is sufficient to cause the outer raceway and its mounted ring 57 to shift in a circumferential direction.

In operation, as when starting a load by closing the manual directional switch element 36, axle 35 is rotated and because of the drag imparted by bearing 55—56, the collar 57 is shifted circumferentially in the direction of axle rotation and against the tension of one of the springs 66 so as that when a predetermined high speed of rotation is reached one end of bus bar 58 is carried out from beneath one of the brushes 59—61 as shown in FIG. 8 to open the motor circuit. When the axle rotation slows down, as upon stopping of the motor, the bar 58 returns to circuit closing position and if power is still required and switch element 36 held closed, the motor restarts. This cyclical operation of torque switch 38 continues so long as power is required and the switch element 36 is held closed. The operation of the torque switch is the same as described above when overcoming resistance to an incline or other obstruction.

Referring now to the embodiment illustrated in FIG. 9 the structure of the power assist control mechanism is substantially like that previously described except that only one overrunning clutch 39a is used. In this instance the clutch is mounted on stud shaft 32 to which gear 31 of the gear train is fixedly secured. The other gear 33 on said shaft is loosely mounted thereon and it has a circular flange 46a which provides the circumferential surface for co-operation with the bearing elements 48. In other respects the centrifugal clutch is like the one disclosed in detail in FIGS. 5 and 6 with the exception that by reason of its being carried on stud shaft 32 it is entirely enclosed within gear housing 22—23. The torque switch 38a is like torque switch 38 and it is enclosed within the housing 22—23 on axle 35 with its inner race secured firmly to said axle and its outer race and insulation ring surrounding same, and having lugs 62a (one shown) cooperating with spring pins supported in a mounting bracket 64a on the inside of housing 22. Although not illustrated, the electrical contacts on said switch are suitably provided with a protective covering so as to render them harmless to the grease or other lubricant contained within housing 22—23.

The structure illustrated in FIGS. 10 and 11 is substantially like the FIG. 3 structure except that a different type of load actuated switch is employed and like numerals identify corresponding parts. As shown the bearing supports 21b are of a length to provide a space or clear area above the wheel or wheels 19 journalled therein to receive mounted therebetween the handle 14a. Handle 14a is journalled on a rod 71 which has its ends freely slidable in horizontal slots 72 in said bearing supports. Mounted on said rod 71, one on each side of handle 14a are spacer blocks 73—73a the latter having a depending lug 74 adapted to engage and close either one or the other of a pair of normally open directional switches 75, 76 supported thereheneath. Springs 77, arranged between said blocks 73—73a and adjustable plates 78 are provided to normally retain the handle rod 71 in the position substantially as illustrated. Tension adjustment is obtained by adjusting screws 79 carried in wall portions 81 integral with bearing supports 21b.

In operation when a normal load is being pushed or drawn by manual engagement with handle 14a the springs 77 operating in opposition to the direction of pull prevent excessive movement of the rod 71 in slots 72. However, any push or pull exerted and which is sufficient to overcome said spring resistance, as when starting a load or moving over an obstruction or up an incline, causes the lug 74 to move into engagement with one or the other switch 75, 76 and close same to complete the electric circuit to motor 24, thus starting said motor and driving the wheels until such time as added power is no longer required.

In order to facilitate removal of a spent battery and replacement of a fully charged battery, the battery 37 is fitted with a novel cover plate or terminal connector including plug-in terminals. As best shown in FIGS. 12 and 13, a body 82 fabricated, as by molding, from non-conductive material such as di-electric plastic, and of a size corresponding substantially to the perimeter size of battery 37 is fitted over the top thereof. This body or cover plate has a pair of female terminal fittings 83, 84 embedded therein, each of which is telescoped over and engaged electrically with one of the usual terminal posts 85a on the battery. Leads 85, 86 embedded in the cover plate connect the respective terminal fittings one with each of a pair of terminal posts 87, 88 projecting beyond one end of the cover plate. If desired, a rectangular centrally located opening 89 may be formed in plate 82 to afford access to service plugs 91 of the battery.

A battery thus fitted with a cover plate 82 may be easily and quickly positioned within truck housing 13, as by providing a door 92 in one wall thereof and when so placed, its posts 87, 88 may be engaged over terminal sockets contained in a journal box 93 (FIG. 1) or the like, to connect the battery to the motor circuitry. When a battery is removed for recharging, the terminal posts 87, 88 can be mated with sockets provided on conventional charging equipment (not shown) thus minimizing time and effort normally required to connect the battery to such equipment.

It should be quite evident that applicant has provided a novelly constructed assemblage that is not expensive to manufacture or to incorporate in present types of hand trucks and one that is easy to service, extremely efficient in use, economical to use and positive in its operation.

Although I have described preferred embodiments of my invention in considerable detail, it will be understood that the descriptions thereof are intended to be illustrative, rather than restrictive, as many details of the structure shown may be modified or changed without departing from the spirit or scope of the invention. Accordingly, I do not desire to be restricted to the exact construction described.

I claim:

1. Drive mechanism for a hand drawn vehicle of a character having supporting wheels and a draft handle, said mechanism comprising, in combination, an axle mounting at least one of said wheels, a reversible electric motor having a drive connection with said axle, an electric circuit for connecting said motor with a source of electric current, a normally open on-off switch in said electric circuit manually actuable to close the circuit for operating the motor in forward or reverse directions, a normally closed motor control switch in said circuit operable in response to predetermined load speeds in either direction to open the circuit and stop the motor, and a normally disengaged bi-directional clutch in said drive connection operable to connect the motor and axle when the motor is in operation.

2. Control mechanism for a vehicle of a type including an electric power source having a drive connection with an axle, a control switch in the electric circuit to said power source, said switch comprising a ring frictionally mounted on the axle for circumferential displacement in response to a predetermined speed of rotation of said axle, adjustable means to resist ring displacement in either direction, an electrical conductor carried by said ring, and electric terminals in said circuit normally contacting said conductor to close the circuit to the power source, said conductor being movable out of contact with one or the other terminal upon displacement of said ring during axle rotation and opening of the circuit.

3. Drive mechanism for a hand drawn industrial vehicle of a character having supporting wheels, said mechanism comprising, in combination, a reversible electric motor, an electric circuit connecting said motor with a source of electric current, an axle, a gear train connecting the motor with said axle for driving the latter, at least one of said wheels being mounted for free rotation on said axle, a manual switch in said circuit adapted to be closed to start the motor and rotate the axle, a bi-directional clutch operable to connect the axle and wheel in response to rotation of the axle in either direction, and a normally closed torque switch in said circuit operable in response to a predetermined speed of axle rotation in either direction to open the circuit and stop the motor.

4. Drive mechanism for a hand drawn industrial vehicle of a character having at least one supporting wheel, said mechanism comprising, in combination, a reversible electric motor, an electric circuit connecting said motor with a source of electric current, an axle, a gear train connecting the motor with said axle for driving the latter, said wheel being mounted for free rotation on said axle, a manual switch in said circuit adapted to be closed to start the motor and rotate the axle, a clutch operable to connect the axle and wheel in response to rotation of the axle in either direction, and a normally closed switch in said circuit operable in response to a predetermined speed of axle rotation in either direction to open the circuit and stop the motor.

5. Control mechanism for a vehicle of a type including an electric power source having a drive connection with an axle, a control switch in the electric circuit to said power source, said switch comprising a ring frictionally mounted on the axle for circumferential displacement in response to the speed of rotation of said axle, means to resist ring displacement in either direction, an electrical conductor on a segment of said ring, and electric terminals in said circuit normally contacting said conductor to close the circuit to the power source, said conductor being movable out of contact with one or the other terminal upon displacement of said ring during axle rotation and opening of the circuit.

6. Drive mechanism for a hand drawn industrial vehicle of a character having supporting wheels and a draft handle, said mechanism comprising, in combination, an axle, a motor having a drive connection with said axle, said connection including a normally disengaged bi-directional clutch, an electric circuit connecting said motor with a source of electric current, at least one of said wheels being mounted on said axle, a normally open on-off switch in said electrical circuit manually actuable to close the circuit for operating the motor in forward or reverse directions, and engage the clutch and rotate the axle, and a normally closed torque switch in said circuit operable in response to a predetermined speed of axle rotation to open the circuit and stop the motor so as to disengage the clutch.

7. Drive mechanism for a hand drawn industrial vehicle of a character having supporting wheels and a handle, said mechanism comprising, in combination, an electric motor, an electric circuit for connecting said motor with a source of electric current, a normally open on-off switch in said electric circuit manually actuable to close the circuit for operating the motor in forward or reverse directions, an axle mounting at least one of said wheels, a gear train connecting the motor with said axle for driving, the latter, a normally disengaged bi-directional clutch in said gear train adapted to be engaged during operation of the motor, and a normally closed switch in said circuit operable in response to a predetermined axle torque speed to open the circuit and stop the motor so as to disengage the clutch and permit free wheeling of the wheel.

8. Power drive mechanism for intermittently driving a hand drawn vehicle of a character including a supporting wheel and a draft handle, an axle mounting said wheel, a reversible electric motor, an electric circuit for connecting said motor to a source of electric current, a normally open on-off switch in said electric circuit manually actuable to close the circuit for operating the motor in forward or reverse directions, a bi-directional clutch actuable during operation of the motor to connect the motor to said wheel for driving the wheel, and a normally closed switch in said circuit operable in response to a predetermined axle torque speed to open the circuit and stop the motor so as to disengage the clutch and permit free wheeling of the wheel.

9. Power drive mechanism for a hand drawn vehicle of a character including a supporting wheel and a draft handle, an axle mounting said wheel, a reversible motor, an electric circuit for connecting said motor to a source of electric current, a normally open on-off switch in said electric circuit, said switch being mounted in the handle and being manually actuable to close the circuit for operating the motor in forward or reverse directions, a bi-directional clutch actuable during operating of the motor to connect the motor to said wheel for driving the wheel, and a normally closed switch in said circuit operable in response to a predetermined axle torque speed to open the circuit and stop the motor so as to disengage the clutch and permit free wheeling of the wheel.

10. Power drive mechanism for intermittently driving a hand drawn vehicle of a character having a steerable wheel journal mounting at least one wheel, a draft handle connected to said journal, an axle in said journal and upon which said wheel is mounted for free rotation, a reversible electric motor mounted on said journal, a drive connection between said motor and axle, an electric circuit for connecting said motor to a source of electric current, a manually operated on-off forward and reverse switch in said circuit, said switch being mounted in said handle, a normally closed switch in said circuit operable in response to predetermined load speeds of the axle in either direction to open and stop the motor while the on-off switch remains closed, and a normally disengaged bi-directional clutch operable to connect the wheel to the axle during operation of the motor.

References Cited in the file of this patent

UNITED STATES PATENTS

| | | |
|---|---|---|
| 2,138,239 | Irgens | Nov. 29, 1938 |
| 2,244,216 | Pieper | June 3, 1941 |
| 2,357,567 | Williams | Sept. 5, 1944 |
| 2,395,323 | Framhein | Feb. 19, 1946 |
| 2,420,100 | Salsbury | May 6, 1947 |
| 2,513,718 | Gfrorer | July 4, 1950 |
| 2,556,939 | Povinelli | June 12, 1951 |
| 2,733,771 | Sullivan | Feb. 7, 1956 |
| 2,775,132 | Orr et al. | Dec. 25, 1956 |
| 2,879,858 | Thomas | Mar. 31, 1959 |
| 2,892,179 | De Voe | June 23, 1959 |